United States Patent
Ahn et al.

(10) Patent No.: US 10,121,282 B2
(45) Date of Patent: Nov. 6, 2018

(54) IMAGE PROCESSING APPARATUS AND METHOD

(71) Applicant: SAMSUNG ELECTRONICS CO., LTD., Suwon-si (KR)

(72) Inventors: Minsu Ahn, Seoul (KR); Seungin Park, Yongin-si (KR); Hyong Euk Lee, Suwon-si (KR); Inwoo Ha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 14/935,875

(22) Filed: Nov. 9, 2015

(65) Prior Publication Data
US 2016/0148419 A1    May 26, 2016

(30) Foreign Application Priority Data
Nov. 21, 2014    (KR) .................. 10-2014-0163506

(51) Int. Cl.
*G06T 15/50*    (2011.01)
(52) U.S. Cl.
CPC .................. *G06T 15/506* (2013.01)
(58) Field of Classification Search
None
See application file for complete search history.

(56) References Cited

U.S. PATENT DOCUMENTS

| | | | |
|---|---|---|---|
| 5,739,820 A * | 4/1998 | Lyon | G06T 15/50 345/426 |
| 7,808,503 B2 | 10/2010 | Duluk, Jr. et al. | |
| 2004/0041809 A1 | 3/2004 | Thornber et al. | |
| 2004/0130552 A1 | 7/2004 | Duluk, Jr. et al. | |
| 2008/0273787 A1 | 11/2008 | Ducksbury et al. | |
| 2010/0277477 A1 | 11/2010 | Wang et al. | |
| 2012/0299921 A1 * | 11/2012 | Budge | G06T 15/06 345/426 |
| 2012/0299922 A1 * | 11/2012 | Ha | G06T 15/506 345/426 |
| 2013/0328873 A1 * | 12/2013 | Harada | G06T 15/405 345/422 |

FOREIGN PATENT DOCUMENTS

KR    10-2009-0021867 A    3/2009

OTHER PUBLICATIONS

Prutkin et al., "Reflective Shadow Map Clustering for Real-Time Global Illumination," Jan. 2012, Eurographics, pp. 1-4.*

* cited by examiner

*Primary Examiner* — Andrew G Yang
(74) *Attorney, Agent, or Firm* — NSIP Law

(57) ABSTRACT

Provided is an image processing apparatus that may determine whether indirect lights are to be assigned to tiles for tile-based deferred rendering. For example, the image processing apparatus includes a calculator configured to calculate a correlation based on at least one of a first vector representing an object normal direction of a tile to be rendered and a second vector corresponding to a normal vector of an indirect light to be determined to be assigned to the tile, and a determiner configured to determine whether the indirect light is to be assigned to the tile by comparing the correlation to a threshold value.

15 Claims, 11 Drawing Sheets

IMAGE PROCESSING APPARATUS AND METHOD

CROSS-REFERENCE TO RELATED APPLICATION(S)

This application claims the benefit under 35 USC 119(a) of Korean Patent Application No. 10-2014-0163506 filed on Nov. 21, 2014, in the Korean Intellectual Property Office, the entire disclosure of which is incorporated herein by reference for all purposes.

BACKGROUND

1. Field

The following description relates to image processing. The following description also relates to rendering that provides global illumination effects or indirect illumination effects.

2. Description of Related Art

In various fields, for example, three-dimensional (3D) games, virtual reality animation, and movies, an interest in real-time rendering for a 3D graphical model is increasing. When a 3D scene is rendered using global illumination technology, virtual point lights (VPLs) that represent indirect illumination effects, for example, diffraction and reflection of light in an image space, may be sampled to improve image realism. In some cases, a number of such VPLs may be sampled and thus, a computational complexity for visibility check and shading in a rendering process may increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing apparatus includes a calculator configured to calculate a correlation between a normal distribution of an object vertex corresponding to a first tile to be rendered and a light radiation direction of a first virtual point light (VPL) sampled in a three-dimensional (3D) space, and a determiner configured to determine the first VPL to be an indirect light source to be used to render the first tile in response to the correlation being greater than or equal to a first threshold value.

The calculator may be configured to calculate the correlation based on a first vector representing a normal direction of the object vertex, and a second vector corresponding to a normal vector of the first VPL.

The first vector may a unit vector obtained by calculating a weighted sum of distributions of normal vectors of the object vertex and another object vertex corresponding to the first tile to be rendered.

The determiner may be configured to determine, to be the indirect light source, a VPL having a normal vector of which a dot product with the second vector is greater than or equal to a second threshold value, among VPLs sampled in the 3D space.

The determiner may be configured to determine, to be the indirect light source, a VPL having a normal vector of which a dot product with the second vector is greater than or equal to a second threshold value, and sampled at a position a distance apart from a position of the first VPL, among the VPLs sampled in the 3D space, and wherein the distance is less than a third threshold value.

The apparatus may further include a clusterer configured to cluster VPLs sampled in the 3D space based on a normal vector distribution.

The light radiation direction of the first VPL may correspond to a first vector representing a VPL normal vector distribution included in a first cluster comprising the first VPL, and the determiner may be configured to determine a VPL included in the first cluster to be the indirect light source in response to the correlation being greater than or equal to the first threshold value.

The clusterer may be configured to determine, to be an identical cluster, VPLs having normal vector dot products greater than or equal to a second threshold value, and sampling positions less than a third threshold value, among the VPLs sampled in the 3D space.

The first VPL may be a VPL having an influence range overlapping a view frustum corresponding to the first tile, among VPLs sampled in the 3D space.

In another general aspect, an image processing apparatus includes a clusterer configured to cluster virtual point lights (VPLs) sampled in a three-dimensional (3D) space based on at least one of sampling positions and normal vector directions of the sampling positions, and a determiner configured to determine whether a first cluster is to be used to render a first tile based on a correlation between a normal direction of an object vertex within the first tile to be rendered and a normal direction representing the first cluster classified by the clustering.

The determiner may be configured to determine that the first cluster is to be used to render the first tile when a dot product between a first vector representing the normal direction of the object vertex within the first tile and a second vector corresponding to a unit vector of a direction from the object vertex toward the first cluster is greater than or equal to a first threshold value.

The determiner may be configured to determine that the first cluster is to be used to render the first tile when a dot product between a third vector corresponding to the normal vector representing the first cluster and a fourth vector corresponding to a unit vector of a direction from the first cluster toward the object vertex is greater than or equal to a first threshold value.

In another general aspect, an image processing method of an image processing apparatus comprising a processor includes calculating a correlation between a first vector representing a normal direction of an object vertex within a first tile to be rendered and a second vector corresponding to a normal vector of a first virtual point light (VPL) sampled in a three-dimensional (3D) space, and determining the first VPL to be an indirect light source to be used to render the first tile when the correlation is greater than or equal to a first threshold value.

The method may further include clustering VPLs sampled in the 3D space based on a normal vector distribution, wherein the second vector is a normal vector representing a first cluster comprising the first VPL, and the determining comprises determining a VPL included in the first cluster to be the indirect light source when the correlation is greater than or equal to the first threshold value.

The clustering may include determining, to be an identical cluster, VPLs having normal vector dot products greater than or equal to a second threshold value to be an identical cluster, among the VPLs sampled in the 3D space.

The clustering may include determining, to be the identical cluster, VPLs having normal vector dot products greater than or equal to the second threshold value, and sampling positions less than a third threshold value, among the VPLs sampled in the 3D space.

The first VPL may be a VPL having an influence range overlapping a view frustum corresponding to the first tile, among VPLs sampled in the 3D space.

In another general aspect, a non-transitory computer-readable storage medium includes a program comprising instructions to cause a computer to perform the above method.

In another general aspect, an image processing method includes clustering virtual point lights (VPLs) sampled in a three-dimensional (3D) space based on sampling positions of the VPLs and/or normal vector directions of the sampling positions of the VPLs, and determining whether a cluster is to be used to render a tile based on a correlation between a normal direction of an object vertex within the tile to be rendered and a normal direction representing the cluster classified by the clustering.

The determining may include determining that the first cluster is to be used to render the first tile when a dot product between a first vector representing the normal direction of the object vertex within the first tile and a second vector corresponding to a unit vector of a direction from the object vertex toward the first cluster is greater than or equal to a first threshold value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
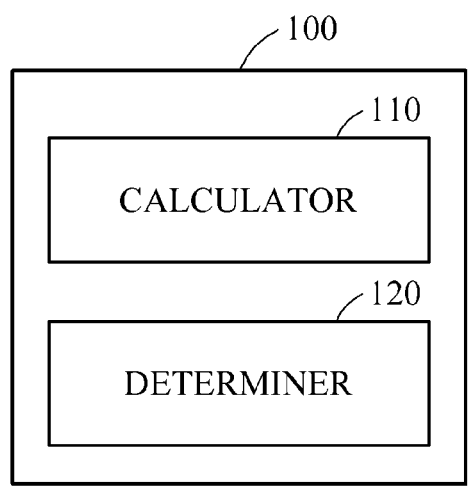
FIG. 1 is a block diagram illustrating an example of an image processing apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference is made in detail to examples with reference to the accompanying drawings, wherein like reference numerals refer to like elements throughout.

The terms used herein are mainly selected from general terms currently being used in light of functions in the present disclosure. Yet, other terms are potentially used based on the development and/or changes in technology, a custom, or a preference of an operator. Thus, it should be understood that the terms used herein are example terms to describe particular examples, and should not be interpreted as limiting the spirit of the present disclosure.

In addition, in a specific example, most appropriate terms are arbitrarily selected for ease of description and/or for ease of understanding. In this instance, the meanings of the arbitrarily used terms are clearly explained in the corresponding description. Hence, the terms are intended to be understood not by the simple names of the terms but by the meanings of the terms in context and as intended and the following overall description of this specification.

FIG. 1 is a block diagram illustrating an example of an image processing apparatus.

Referring to the example of FIG. 1, an image processing apparatus 100 determines whether indirect lights are to be assigned to tiles for deferred rendering. In the example of FIG. 1, the tiles are partial areas divided on a screen space for tile-based rendering. The image processing apparatus 100 includes a calculator 110, and a determiner 120.

For example, the calculator 110 calculates a correlation of a first virtual point light (VPL) sampled in a three-dimensional (3D) space with a first tile to be rendered, based on at least one of a first vector representing a normal direction of at least one object vertex within the first tile and a second vector corresponding to a normal vector of the first VPL. In this example, the first vector is a unit vector obtained by calculating a weighted sum of distributions of normal vectors of the at least one object vertex.

In this example, the correlation is a first dot product value corresponding to a dot product of the first vector and a first direction vector in a direction from the at least one object vertex toward the first VPL. Alternatively, the correlation is a second dot product value corresponding to a dot product of the second vector and a second direction vector in a direction from the first VPL toward the at least one object vertex. Further, in another example, the correlation is a product of the first dot product value and the second dot product value, and a value greater than or equal to "0" and less than or equal to "1". The correlation is described in further detail with reference to FIG. 4.

Also in the example of FIG. 1, the determiner 120 determines the first VPL to be an indirect light source that is to be used to render the first tile when the correlation is greater than or equal to a first threshold value. Determining the first VPL to be an indirect light source that is to be used to render the first tile is to be understood as performing deferred rendering by assigning the first VPL to the first tile. In such an example, the determiner 120 determines, to be the indirect light source, at least one VPL having a normal vector of which a dot product with the second vector is greater than or equal to a second threshold value, among a plurality of VPLs sampled in the 3D space. In this example, the determiner 120 determines, to be the indirect light source, at least one VPL having a normal vector of which a dot product with the second vector is greater than or equal to the second threshold value, and sampled at a position a distance apart from a position of the first VPL, among the plurality of VPLs sampled in the 3D space. For example, the distance is less than a third threshold value.

Figure 2:
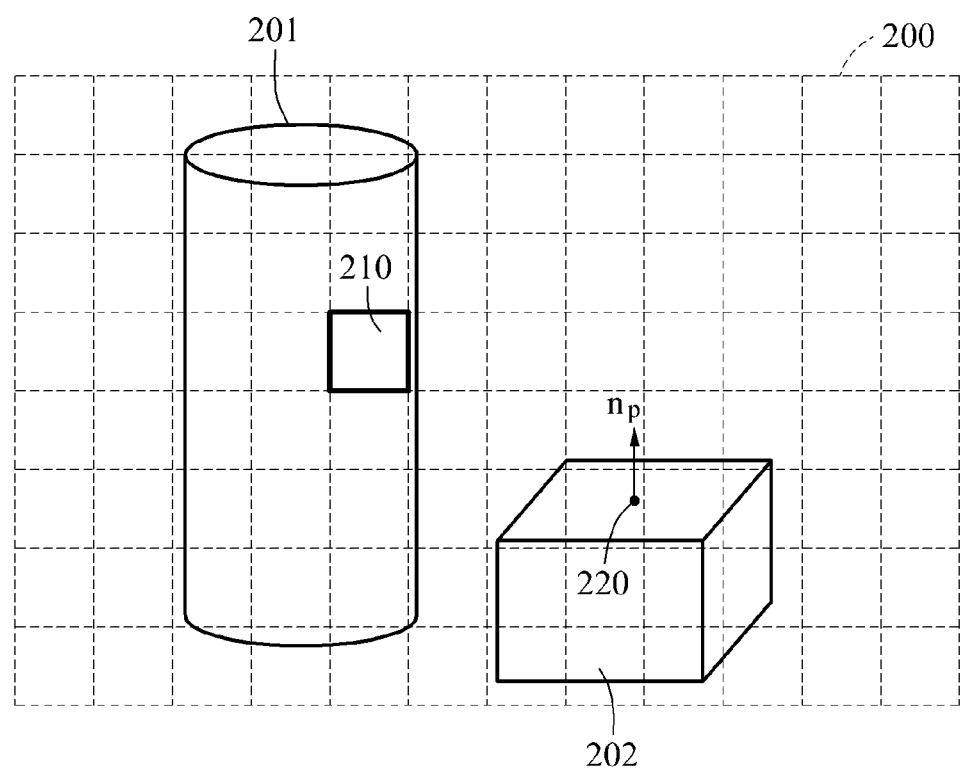
FIG. 2 illustrates an example of a process of dividing a screen space into a plurality of areas.

FIG. 2 illustrates an example of a process of dividing a screen space into a plurality of areas.

Referring to the example of FIG. 2, an object 201 and an object 202 are illustrated. A 3D space converted into a screen space corresponding to a rendering point of view is divided into a plurality of tiles 200. Such tile-based processing is advantageous to Graphics Processing Unit (GPU) acceleration through parallel processing, in that multiple tiles are potentially rendered simultaneously. Further, unnecessary processing is potentially minimized by tile-based deferred lighting, in that redundant or excessive processing is potentially avoided.

In the example of FIG. 2, such tile division is performed by generating uniform grids in the screen space. Further, in an example, the tile division is performed by non-uniform grids based on an importance or a texture complexity.

Hereinafter, examples of assigning a light source, more particularly, an indirect light source, to be used to render a divided tile 210 are discussed further. For example, the indirect light source is a VPL. In such an example, the VPL is sampled in a 3D space. For example, a number of VPLs is potentially in a range of hundreds to thousands, or more. When a large quantity of such VPLs are considered in shading/lighting of all pixels and/or all tiles during the rendering process, a computational complexity potentially greatly increases due to the large amount of relevant calculation that becomes relevant. Thus, in an example, information regarding which VPL, among candidate VPLs as discussed, is to be actually used to shade which tile during the rendering is preprocessed to improve efficiency.

For example, it is assumed that a VPL 220 is sampled on the object 202. A normal vector of a tangent plane of a portion in which the VPL 220 is sampled is expressed as $n_p$. In a lighting operation of calculating an influence of a light source on a pixel, a difference between considering a direct light source and an indirect light source is that a normal direction of an object on which an indirect light source is sampled is potentially considered. The indirect light has a relatively great influence on a surface disposed in a direction identical to that of the normal vector, and the indirect light has a relatively lower degree of influence on a surface disposed in a direction perpendicular to the normal vector.

Thus, a determination of whether the VPL 220 is to be reflected in rendering of the tile 210, more specifically, whether the VPL 220 is to be assigned to the tile 210, is determined based on the normal vector $n_p$, as described in the following examples.

Figure 3:
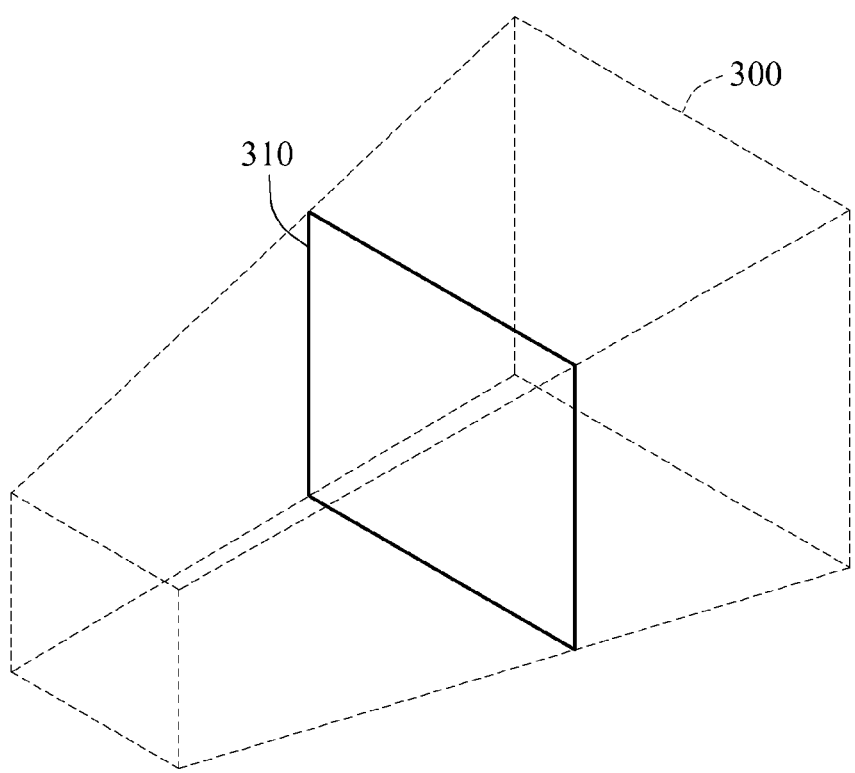
FIG. 3 illustrates an example of a tile and a view frustum.

FIG. 3 illustrates an example of a tile and a view frustum.

Referring to the example of FIG. 3, a view frustum 300 is a virtual area or range from a point of view of a camera associated with a screen space toward a tile 310. In an example, whether a predetermined VPL or a VPL group is to be assigned to the tile 310 is determined with respect to determining whether a VPL has an influence on the contents of view frustum 300, rather than all VPLs sampled in a 3D space.

In the example of FIG. 3, whether a VPL has an influence on a view frustum is determined based on several criteria. In an example, a sphere, a hemisphere, or a cone including a sampling position of a VPL at its center and having a predetermined radius is regarded as an influence range of the VPL. The predetermined radius is potentially variable in view of various factors, for example, an intensity of the VPL, and a texture complexity. When an influence range of the VPL overlaps the view frustum, the VPL is regarded as having a possibility of influencing a corresponding tile, and whether the VPL is to be assigned to the tile is then determined to be appropriate. Conversely, when the influence range of the VPL does not overlap the view frustum, whether the corresponding VPL is to be assigned to a tile is then determined to not be appropriate. The foregoing process is described in further detail with reference to FIG. 8.

In an example, normal distributions of object vertices included in the view frustum 300 are determined, and a representative normal vector representing the normal distributions is determined. In this example, the representative normal vector is a unit vector perpendicular to a tangent plane representing the view frustum 300.

Figure 4:
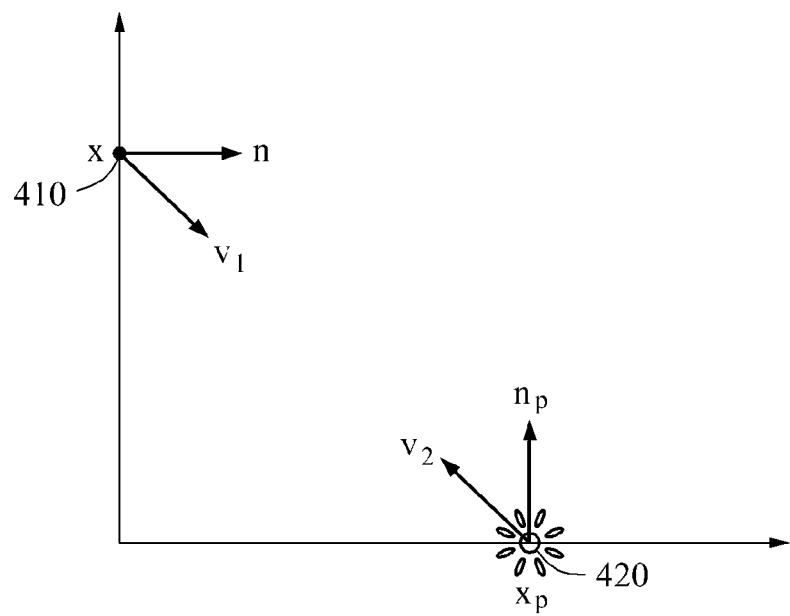
FIG. 4 illustrates an example of a normal analysis.

FIG. 4 illustrates an example of a normal analysis.

Referring to the example of FIG. 4, a point 410 corresponds to a predetermined vertex included in a view frustum. A normal vector at a position x of the point 410 is indicated in the example of FIG. 4 by n. In this example, the normal vector n is a representative normal vector representing normals of vertices within the view frustum.

In the example of FIG. 4, a point 420 corresponds to a vertex at a sampling position $x_p$ of an indirect light, for example, a VPL. $n_p$ denotes a normal vector at the position $x_p$ of the VPL. When other factors are ignored, the VPL has its greatest influence in a direction of the normal vector $n_p$. Further, the point 410 receives large influences from VPLs closest to the direction of the normal vector n. In this example, a brightness by a direct light, not shown, and a brightness by an indirect light are calculated as expressed by Equations 1 and 2, below. In Equations 1 and 2, $C_d$ denotes a color brightness value at the point 410 by a direct light, and $C_p$ denotes a color brightness value of the point 410 by a VPL. When comparing Equation 2 to Equation 1, a term of a normal vector of the VPL and the point 410 is added in Equation 2. As described above, this corrective term corresponds to that in general, the VPL corresponding to the indirect light has its greatest influence in a direction of the normal vector $n_p$ of the VPL, and that the point 410 has its greatest influence in a direction of the normal vector n of the point 410.

$$C_d = \Phi_d \frac{\max\{0, n \cdot (x - x_d)\}}{|x - x_d|^3} \qquad \text{Equation 1}$$

$$C_p = \Phi_p \frac{\max\{0, n_p \cdot (x_p - x)\} \cdot \max\{0, n \cdot (x - x_p)\}}{|x - x_p|^4} \qquad \text{Equation 2}$$

Thus, based on the forgoing discussion, whether a VPL is to be reflected in rendering of the point 410 and a tile including the point 410 is determined using a normal vector direction. In further detail, an influence determined based on normal vectors and relative positions of a VPL and a point is quantized as a value, and the value is compared to a threshold value to determine whether the VPL is to be assigned to the tile as part of the tile's rendering process.

For example, in the example of FIG. 4, a direction vector from the position x of the point 410 toward the position $x_p$ of the VPL is $v_1$, and a direction vector from the position $x_p$ of the VPL toward the position x of the point 410 is $v_2$. Whether an influence of the VPL on the position x of the point 410 and a tile including the position x is significant, more specifically, whether the VPL is to be included in rendering of the tile corresponding to the point 410 is determined.

In the example of FIG. 4, a dot product $s_1$ of the direction vector $v_1$ and the normal vector n is obtained. When the obtained $s_1$ is greater than or equal to a predetermined threshold value $T_1$, the VPL is determined to be assigned to render the tile that includes the point 410.

In another example, a dot product $s_2$ of the direction vector $v_2$ and the normal vector $n_p$ is obtained. When the obtained $s_2$ is greater than or equal to a predetermined threshold value $T_2$, the VPL is determined to be assigned to render the tile including the point 410. In this example, the threshold value $T_1$ is equal to or different from the threshold value $T_2$.

A product s of $s_1$ and $s_2$, namely, $s=s_1*s_2$, is compared to a threshold value T. In an example, the threshold value T is obtained as $T=T_1*T_2$. When the product s is greater than or equal to the threshold value T, the VPL is determined to be assigned to render the tile including the point 410.

The foregoing descriptions are provided as examples only, and the determination criteria or equations related to a determination method are not limited thereto as they may be modified in various manners that allow determination in any appropriate manner. For example, as an example alternative approach, a product of an inverse direction vector $(-1) \cdot n_p$ of the normal vector $n_p$ of the VPL and the normal vector n is compared to the threshold value T. Thus, when an influence of a VPL is quantized and comparable to a threshold value, for example, when a normal direction of a VPL is perpendicular to directions of object vertices included in a tile, other methods are also possible. Further, in another example, joint consideration is given to a bidirectional reflection distribute function (BRDF) of an object point and/or a VPL sample point. Modifications to the foregoing determination criteria and the determination method are variously selected through iterative implementations by those of ordinary skill in the art. Thus, the disclosed examples are not to be taken as limiting.

Figure 5:
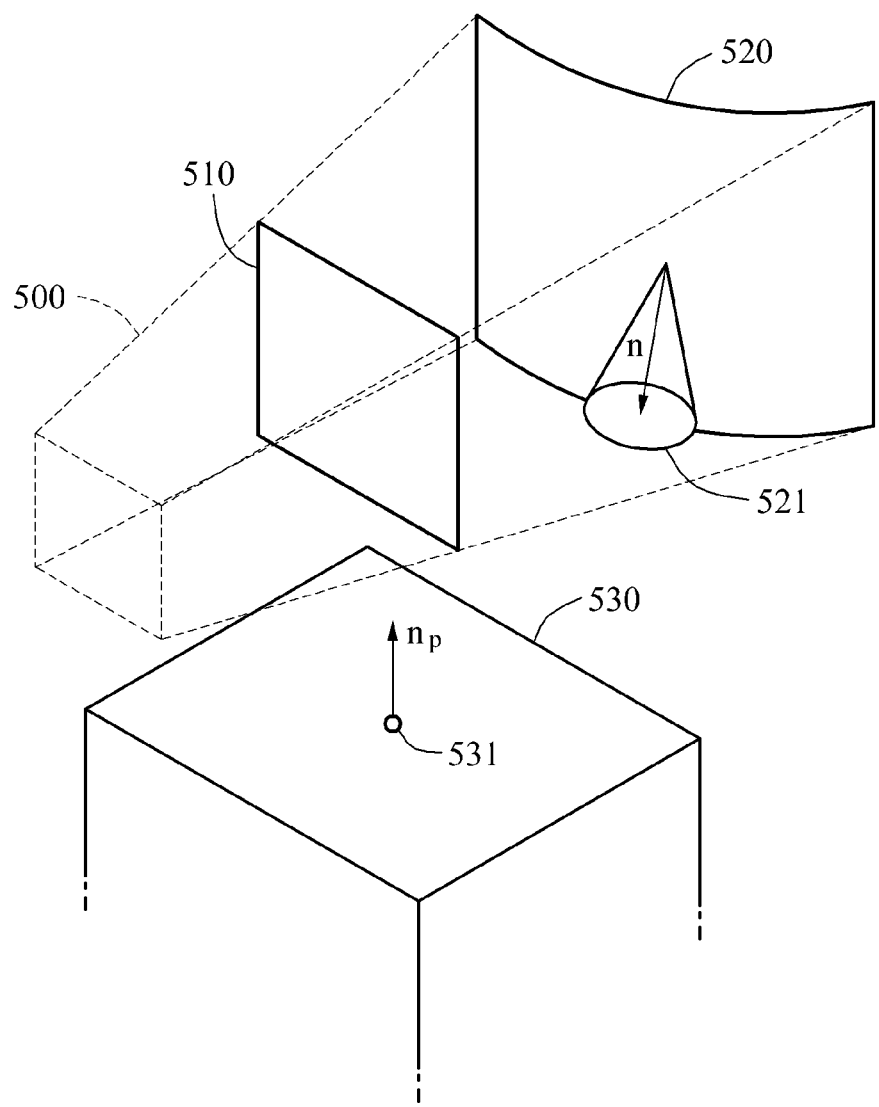
FIG. 5 illustrates an example of a normal distribution of a tile area and an indirect light assignment.

FIG. 5 illustrates an example of a normal distribution of a tile area and an indirect light assignment.

Referring to the example of FIG. 5, a tile 510 generated by performing a tile division in a screen space corresponds to a view frustum 500. In this example, the view frustum 500 includes an object surface 520. In such an example, an image processing apparatus analyzes a normal distribution 521 corresponding to the object surface 520. Through a weighted sum of normal vectors or various linear operations, a representative normal vector n representing the object surface 520 is obtained.

In the example of FIG. 5, a normal vector $n_p$ of a VPL 531 sampled on a predetermined object 530 is obtained. According to the examples described with reference to FIG. 4, whether the VPL 531 is to be assigned to render the tile 510 is determined appropriately.

Figure 6:
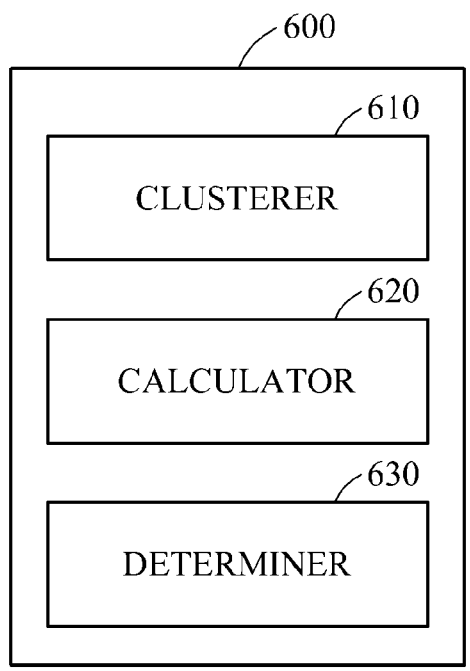
FIG. 6 is a block diagram illustrating another example of an image processing apparatus.

FIG. 6 is a block diagram illustrating another example of an image processing apparatus.

Referring to the example of FIG. 6, an image processing apparatus 600 includes a clusterer 610, a calculator 620, and a determiner 630.

In the example of FIG. 6, the clusterer 610 clusters VPLs sampled in a 3D space. According to the examples described above, determination on which VPL is to be assigned to which tile requires considering operation resources or costs. Thus, such a determination is potentially not performed with respect to all VPLs having similar characteristics at similar positions. In such an example, the clusterer 610 groups VPLs having similar positions and/or similar normal directions, and also classifies VPLs into a plurality of clusters. The clustering process will be described in further detail with reference to FIG. 7.

In the present example, the normal vector $n_p$ of a VPL to be considered in the process described with reference to FIGS. 4 and 5 is selected as a value representing VPLs included in each cluster.

In this example, the calculator 620 calculates a correlation of a first VPL sampled in a 3D space with a first tile to be rendered based on at least one of a first vector representing a normal direction of at least one object vertex within the first tile and a second vector corresponding to a normal vector of the first VPL. In an example, the correlation is a first dot product value corresponding to a dot product of the first vector and a first direction vector in a direction from the at least one object vertex toward the first VPL. In another example, the correlation is a second dot product value corresponding to a dot product of the second vector and a second direction vector in a direction from the first VPL toward the at least one object vertex. Further, the correlation is potentially chosen to be a product of the first dot product value and the second dot product value, and has a value greater than or equal to "0" and less than or equal to "1".

In the example of FIG. 6, the determiner 630 determines the first VPL to be an indirect light source to be used to render the first tile when the correlation is greater than or equal to a first threshold value. Here, the determiner 630 determines, to be the indirect light source, at least one VPL having a normal vector of which a dot product with the second vector is greater than or equal to a second threshold value, among a plurality of VPLs sampled in the 3D space. Detailed operations of the calculator 620 and the determiner 630 are to be understood through the examples described previously with reference to FIGS. 1 through 5.

Figure 7:
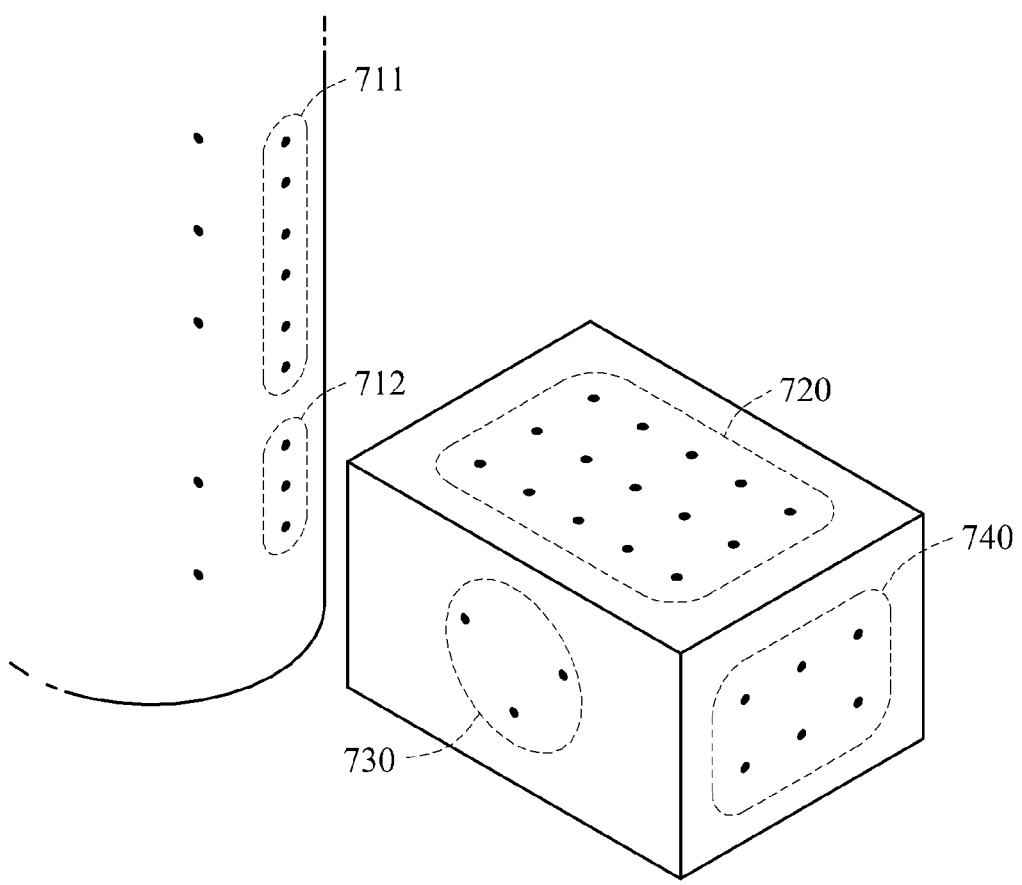
FIG. 7 illustrates an example of clustering indirect lights.

FIG. 7 illustrates an example of clustering indirect lights.

As described above, VPLs having similar normal directions are clustered based on normal directions of VPLs. Through this clustering process, whether a VPL is to be assigned to each tile is determined in VPL cluster units, rather than calculating whether a VPL is to be assigned to each tile with respect to all VPLs. Thus, an operation resource is saved. In the example of FIG. 7, a cluster 720, a cluster 730, and a cluster 740 are results of clustering VPLs having similar normal directions.

In such an example, in addition to or in lieu of similar normal directions, VPLs within a predetermined distance from each other are clustered. In FIG. 7, a cluster 711 and a cluster 712 are classified as different clusters based on distances, despite similar normal directions.

Figure 8:
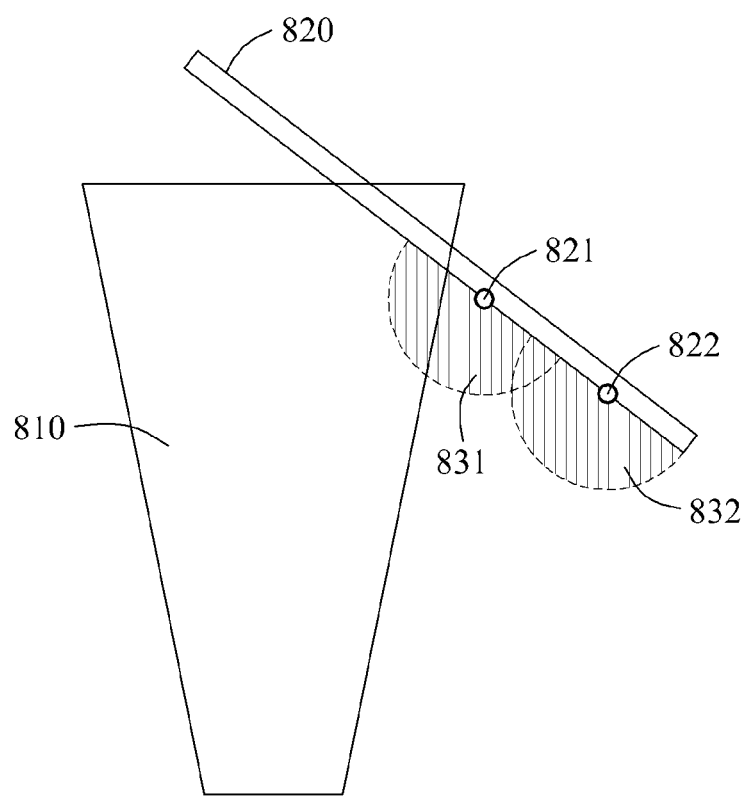
FIG. 8 illustrates an example of a process of determining whether a view frustum overlaps an influence of an indirect light.

FIG. 8 illustrates an example of a process of determining whether a view frustum overlaps an influence of an indirect light.

In the example of FIG. 8, whether a VPL is to be assigned to each tile is determined with respect to a portion of VPLs or VPL clusters, rather than determining whether a VPL is to be assigned to each tile with respect to all VPLs or VPL clusters. As shown in the example FIG. 8, a VPL 821 and a VPL 822 sampled on an object 820 have different influence ranges. Since a VPL is an indirect light, an intensity or an influence range thereof is less than that of a direct light. Further, a VPL is sampled on an object and thus has a limited angle range. For example, an influence range of such a VPL is assumed to be in a form of a sphere or a hemisphere. In such an example, a size/volume of the influence range is determined based on an intensity of the sampled VPL, a material characteristic of a sampling position, a direction, and a reflectance. However, all VPLs potentially do not have identical influence ranges, and as such, in certain examples, the VPLs have differing influence ranges.

In the example of FIG. 8, an influence range 831 of the VPL 821 overlaps a view frustum 810 corresponding to a predetermined tile. In this example, whether the VPL 821 or a VPL cluster, not shown, including the VPL 821 is to be assigned to a tile, not shown, corresponding to the view frustum 810 is determined, as described above. As discussed above, this determination offers the ability to improve rendering efficiency. However, an influence range 832 of the VPL 822 does not overlap the view frustum 810. Thus, in this example, whether the VPL 822 is to be assigned to the tile is not determined and is skipped. Through the foregoing process, an operational resource to be used to determine whether a VPL and/or a VPL cluster is to be assigned to each tile is saved. As a result, real-time rendering is performed more smoothly in a terminal that has limited operational resources.

Figure 9:
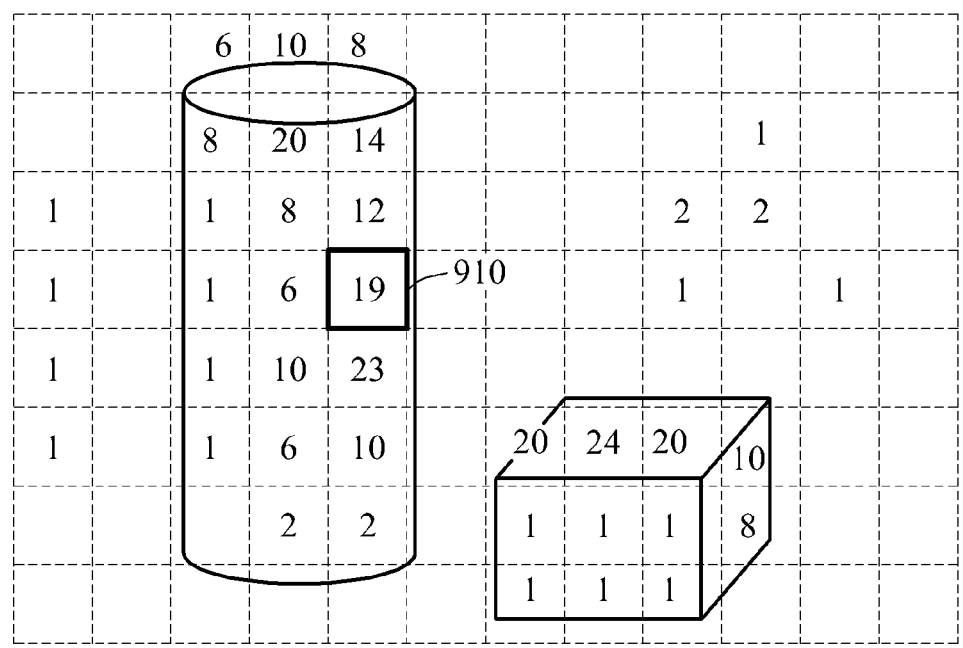
FIG. 9 illustrates an example of a process of assigning an indirect light to each tile and a corresponding result.

FIG. 9 illustrates an example of a process of assigning an indirect light to each tile and a corresponding result.

Referring to the example of FIG. 9, a result 900 of assigning VPLs to tiles by referring to the screen space of FIG. 2 is illustrated. The result 900 illustrated in FIG. 9 is assumed as an example for better understanding. For example, nineteen VPLs are assigned to a tile 910. To render a portion corresponding to the tile 910, a shading is performed with respect to only the assigned nineteen VPLs, rather than processing shading with respect to all VPLs sampled in a 3D space. As shown in FIG. 9, VPLs are be assigned to a portion of the tiles. In an example, shading by VPLs is omitted in rendering of such tiles. Such an approach reduces processing demands, while minimizing any detrimental impact on image quality.

Figure 10:
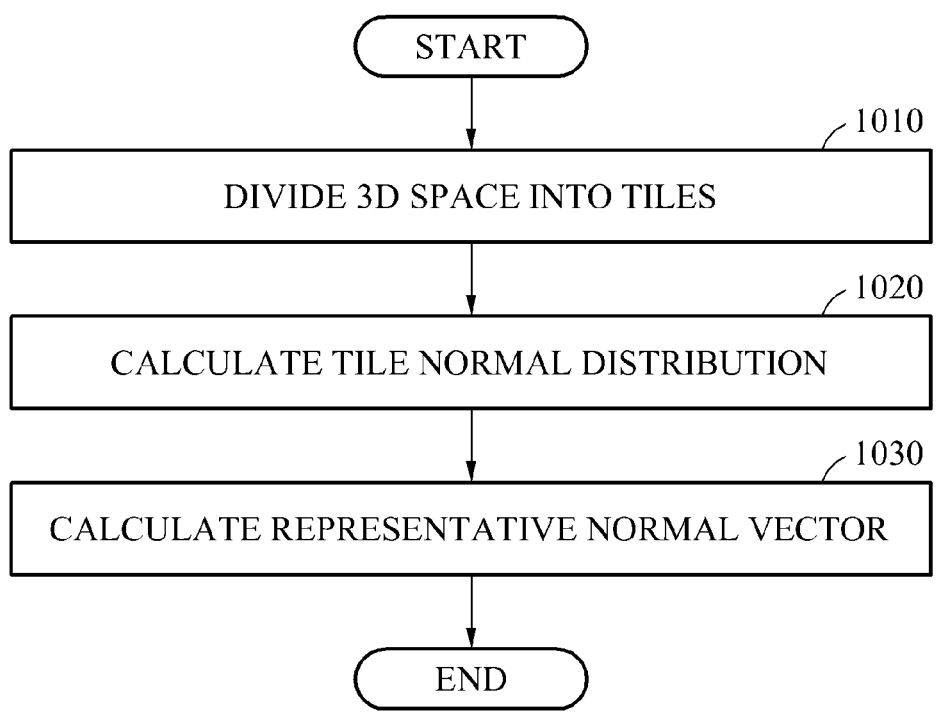
FIGS. 10 and 11 are flowcharts illustrating examples of an image processing method.
Figure 11:
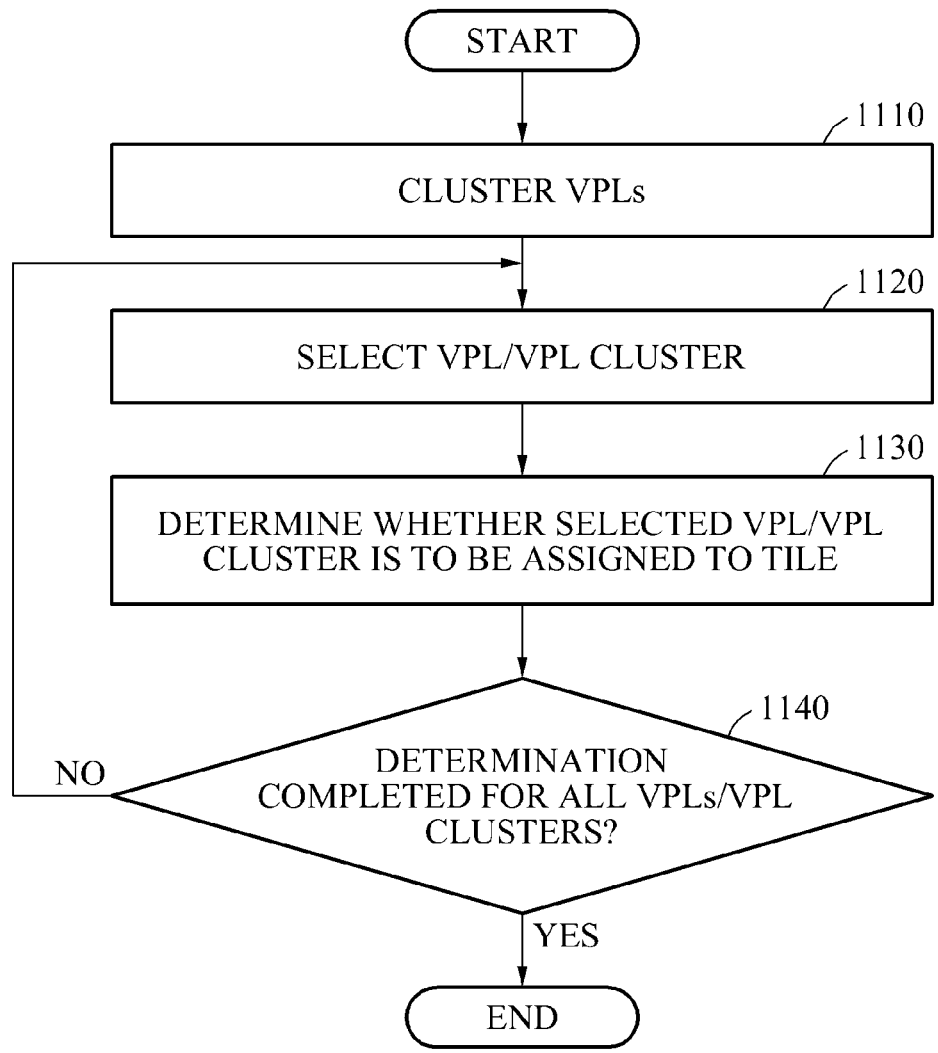

FIGS. 10 and 11 are flowcharts illustrating examples of an image processing method.

Referring to the example of FIG. 10, in operation 1010, a 3D space is divided into a plurality of tiles on a screen space for tile-based deferred rendering. For example, the descriptions provided with reference to FIG. 2 are applicable to the tile division. In an example, each tile is classified by a grid of an identical size. In another example, tiles have different sizes.

In operation 1020, a normal distribution for each tile is calculated. A result of calculating the normal distribution is used to determine a representative normal vector to be used to determine whether a VPL is to be assigned to each tile. In the example of FIG. 5, the normal distribution 521 of the object surface 520 corresponding to the tile 510 is determined.

In operation 1030, a representative normal vector of a corresponding object surface is calculated. Referring to the example of FIG. 5 again, the representative normal vector n representing the normal distribution 521 of the object surface 520 is calculated. For example, the representative normal vector n is obtained by finding a weighted sum of normal vectors.

FIG. 11 is a flowchart illustrating an example of a process of determining whether a VPL and/or a VPL cluster is to be assigned to each tile in an image processing method.

Referring to the example of FIG. 11, in operation 1110, VPLs are clustered. As described above, since a determination on which VPL is to be assigned as to which tile requires an operational resource, the determination is not necessarily performed with respect to all VPLs having similar characteristics at similar positions. Thus, by grouping VPLs having similar positions and/or similar normal directions, VPLs are classified into a plurality of clusters. For example, VPLs having similar normal directions are clustered based on normal directions of the VPLs. Through this approach, whether a VPL is to be assigned to each tile is determined in VPL cluster units, rather than calculating whether a VPL is to be assigned to each tile with respect to all VPLs, such that an operational resource is conserved. Further, in addition to or in lieu of similar normal directions, VPLs within a predetermined distance from each other may be clustered.

In operation 1120, a VPL and/or a VPL cluster for which whether a VPL is to be assigned to each tile is to be determined is selected. In operation 1130, whether the selected VPL and/or the selected VPL cluster is to be assigned to a corresponding tile is determined. The determination is performed based on at least one of a first vector representing normal directions of object vertices within the tile and a second vector representing the VPL and/or the VPL cluster.

In an example, a correlation between the object vertices of the tile and the VPL and/or the VPL cluster is calculated, and compared to a first threshold value. When the correlation is greater than or equal to the first threshold value, the VPL and/or the VPL cluster is determined to be assigned to the tile. In an example, the correlation is a first dot product value corresponding to a dot product of the first vector and a first direction vector in a direction from the object vertices of the tile toward the VPL and/or the VPL cluster. In another example, the correlation is a second dot product value corresponding to a dot product of the second vector and a second direction vector in a direction from the VPL and/or the VPL cluster toward the object vertices of the tile. Further, in another example, the correlation is a product of the first dot product value and the second dot product value, and a value greater than or equal to "0" and less than or equal to "1". The foregoing determination process is understood through the descriptions provided with reference to FIGS. 1 through 6.

In operation 1140, whether the determination of operation 1130 has been performed for all VPLs and/or all VPL clusters is verified. In this example, a VPL and/or a VPL cluster predetermined to be skipped based on a predetermined criterion is excluded from the verification, rather than performing the verification for all VPLs and/or all VPL clusters. By iteratively performing the foregoing process as shown in FIG. 11, the tile assignment is performed. The foregoing process is performed with respect to each of the plurality of divided tiles.

The apparatuses, units, modules, devices, and other components illustrated in FIGS. 1-11 that perform the operations described herein with respect to FIGS. 1-11 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-11. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described herein with respect to FIGS. 1-11 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), or any other device known to one of ordinary skill in the art as being suitable for inclusion in a computing system or computer. The memory controller and the flash memory device may constitute a solid-state drive or disk (SSD) that uses non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing apparatus comprising:
    a calculator configured to calculate a correlation between a normal distribution of an object vertex corresponding to a first tile to be rendered and a light radiation direction of a first virtual point light (VPL) sampled in a three-dimensional (3D) space, based on a first vector representing a normal direction of the object vertex, and a second vector corresponding to a normal vector of the first VPL; and
    a determiner configured to determine the first VPL to be an indirect light source to be used to render the first tile in response to the correlation being greater than or equal to a first threshold value, the first VPL having a normal vector of which a dot product with the second vector is greater than or equal to a second threshold value, among VPLs sampled in the 3D space.

2. The apparatus of claim 1, wherein the first vector is a unit vector obtained by calculating a weighted sum of distributions of normal vectors of the object vertex and another object vertex corresponding to the first tile to be rendered.

3. The apparatus of claim 1, wherein the determiner is configured to determine, to be the indirect light source, a VPL having a normal vector of which a dot product with the second vector is greater than or equal to a second threshold value, and sampled at a position a distance apart from a position of the first VPL, among the VPLs sampled in the 3D space, and
    wherein the distance is less than a third threshold value.

4. The apparatus of claim 1, further comprising:
    a clusterer configured to cluster VPLs sampled in the 3D space based on a normal vector distribution.

5. The apparatus of claim 4, wherein the light radiation direction of the first VPL corresponds to a first vector representing a VPL normal vector distribution included in a first cluster comprising the first VPL, and wherein the determiner is configured to determine a VPL included in the first cluster to be the indirect light source in response to the correlation being greater than or equal to the first threshold value.

6. The apparatus of claim 5, wherein the clusterer is configured to determine, to be an identical cluster, VPLs having normal vector dot products greater than or equal to a second threshold value, and sampling positions less than a third threshold value, among the VPLs sampled in the 3D space.

7. The apparatus of claim 1, wherein the first VPL is a VPL having an influence range overlapping a view frustum corresponding to the first tile, among VPLs sampled in the 3D space.

8. An image processing apparatus comprising:
    a clusterer configured to cluster virtual point lights (VPLs) sampled in a three-dimensional (3D) space based on either one or both of sampling positions and normal vector directions of the sampling positions; and
    a determiner configured to determine whether a first cluster is to be used to render a first tile based on a correlation between a normal direction of an object vertex within the first tile to be rendered and a normal direction representing the first cluster classified by the clustering, in response to a dot product between a first vector representing the normal direction of the object vertex within the first tile and a second vector corresponding to a unit vector of a direction from the object vertex toward the first cluster being greater than or equal to a first threshold value.

9. The apparatus of claim 8, wherein the determiner is configured to determine that the first cluster is to be used to render the first tile when a dot product between a third vector corresponding to the normal vector representing the first cluster and a fourth vector corresponding to a unit vector of a direction from the first cluster toward the object vertex is greater than or equal to a first threshold value.

10. An image processing method of an image processing apparatus comprising a processor, the method comprising:
    calculating a correlation between a first vector representing a normal direction of an object vertex within a first tile to be rendered and a second vector corresponding to a normal vector of a first virtual point light (VPL) sampled in a three-dimensional (3D) space;
    clustering VPLs sampled in the 3D space based on a normal vector distribution,
    wherein the second vector is a normal vector representing a first cluster comprising the first VPL; and
    determining the first VPL to be an indirect light source to be used to render the first tile when the correlation is greater than or equal to a first threshold value, wherein the first VPL is a VPL included in the first cluster.

11. The method of claim 10, wherein the clustering comprises determining, to be an identical cluster, VPLs having normal vector dot products greater than or equal to a second threshold value to be an identical cluster, among the VPLs sampled in the 3D space.

12. The method of claim 11, wherein the clustering comprises determining, to be the identical cluster, VPLs having normal vector dot products greater than or equal to the second threshold value, and sampling positions less than a third threshold value, among the VPLs sampled in the 3D space.

13. The method of claim 10, wherein the first VPL is a VPL having an influence range overlapping a view frustum corresponding to the first tile, among VPLs sampled in the 3D space.

14. A non-transitory computer-readable storage medium storing instructions that, when executed by a processor, cause the processor to perform the method of claim 10.

15. An image processing method comprising:
    clustering virtual point lights (VPLs) sampled in a three-dimensional (3D) space based on either one or both of sampling positions of the VPLs and normal vector directions of the sampling positions of the VPLs; and
    determining whether a cluster is to be used to render a tile based on a correlation between a normal direction of an object vertex within the tile to be rendered and a normal direction representing the cluster classified by the clustering, wherein the determining comprises determining that the first cluster is to be used to render the first tile in response to a dot product between a first vector representing the normal direction of the object vertex within the first tile and a second vector corresponding to a unit vector of a direction from the object vertex toward the first cluster being greater than or equal to a first threshold value.

* * * * *